May 29, 1962 — H. W. MOORE — 3,036,603
COIL WINDING MACHINE
Filed Aug. 5, 1957 — 3 Sheets-Sheet 1

INVENTOR.
HARRY W. MOORE
BY
HIS ATTORNEYS

May 29, 1962  H. W. MOORE  3,036,603
COIL WINDING MACHINE
Filed Aug. 5, 1957   3 Sheets-Sheet 2

INVENTOR.
HARRY W. MOORE
BY
HIS ATTORNEYS

May 29, 1962 H. W. MOORE 3,036,603
COIL WINDING MACHINE
Filed Aug. 5, 1957 3 Sheets-Sheet 3

INVENTOR.
HARRY W. MOORE
BY
HIS ATTORNEYS

United States Patent Office 3,036,603
Patented May 29, 1962

3,036,603
COIL WINDING MACHINE
Harry W. Moore, 5051 Kittridge Road, Dayton, Ohio
Filed Aug. 5, 1957, Ser. No. 676,341
10 Claims. (Cl. 140—92.1)

This invention relates to a coil winding machine, and more particularly to improvements in turret type multiple coil winding machines, although the invention is not necessarily so limited.

In coil winding machines of this type, a flier is employed to remove wire from a supply reel and wind this wire about a receiver having coil forming channels therein. The receiver takes the form of a rotatable turret provided with a plurality of angularly spaced coil receiving channels, such that the flier may be operated substantially continuously to wind successively a plurality of coils on the turret receiver, the turret receiver being intermittently rotated to indexed positions to receive successive coils. Frequently, as in the present embodiment, the turret receiver is provided with a plurality of stepped channels in each receiver position, so that a family of coils may be wound successively onto the turret receiver in each position thereof.

An object of this invention is to provide, in a coil winding machine including a flier for laying a coil and a receiving channel for the coil, means for reciprocating the flier relative to the coil receiving channel so as to layer the coil in the receiving channel, and means for resetting the reciprocating mechanism at the termination of the coil winding operation.

Another object of this invention is to provide, in a turret type coil winding machine wherein the turret is provided with a plurality of coil receiving channels in each angular position thereof, a flier for laying coils in said coil receiving channels, and means for successively shifting the position of said flier relative to said turret so as to wind coils successively into each of said coil receiving channels.

Another object of this invention is to provide, in a turret coil winding machine including a coil winding flier, a turret receiver provided with a plurality of coil receiving channels in each angular position thereof, and means for shifting the position of the flier relative to the turret receiver so as to wind successive coils in said receiving channels, means for over shifting said flier relative to said turret receiver to properly initiate the formation of successive coils.

Still another object of this invention is to provide, in a coil winding machine including a flier for laying a coil and a receiver having a coil forming channel for receiving the coil, means for laying a first adhesive tape over said coil receiving channel prior to the winding of the coil in said channel, means for laying a second adhesive tape over said first tape after the formation of the coil, and means for pressing said adhesive tapes together to thereby bind the coil.

Still another object of this invention is to provide, in a coil winding machine, means for wrapping a segment of the coil with an adhesive to bind the coil.

A further object of this invention is to provide, in combination, means for laying a coil, means including a coil forming channel for receiving the coil, means for wrapping an adhesive about the coil to bind the coil, means for releasing the coil from its receiving channel, means for ejecting the coil from the receiving channel, and means for accepting and accumulating the ejected coils.

Still a further object of this invention is to provide, in a coil winding machine including means providing a coil receiving channel, means for collapsing the coil receiving channel, and means for supporting the coil, upon collapse of the receiving channel, for sliding movement.

Still a further object of this invention is to provide, in a coil winding machine including a turret receiver for receiving a multiplicity of successively wound coils, means for severing selected coils carried by said turret receiver from the remaining coils carried thereby to facilitate removal of the severed coils from the turret receiver.

Yet another object of this invention is to provide in a coil winding machine including a receiver for the wound coils and means for collapsing the receiver to release the coils, ejector means for removing the coils from the collapsed receiver.

Yet a further object of this invention is to provide in combination with a coil winding machine including means for ejecting wound coils from the machine, means for accepting and accumulating the ejected coils over a predetermined interval, said means being adapted to discharge the accumulated coils at the end of said interval at a predetermined location.

Other objects and advantages reside in the construction of parts, the combination thereof, the method of manufacture and the mode of operation, as will become more apparent from the following description.

For the purposes of description, the coil winding machine of this invention is broken down into six component assemblies, namely: (1) a turret assembly for receiving coils as they are wound, (2) a flier assembly for winding successive coils upon the turret receiver, (3) a tape laying assembly for binding the coils with an adhesive tape, (4) a release mechanism for collapsing portions of the turret assembly to release completed coils, (5) an ejector assembly for removing completed coils from the turret receiver, and (6) an accumulator assembly for collecting the ejected coils for subsequent discharge. In the following, these component assemblies are described in detail under separate sub-headings.

While the coil winding machine is sub-divided into numerous components for the purposes of description, it is to be understood that these components operate together in a predetermined sequence to produce the final product, a family of coils. Accordingly, the final portion of the following description is devoted to the sequential operation of the several component assemblies, that is, the programming of the machine.

Turret Assembly

Figures 1, 7:
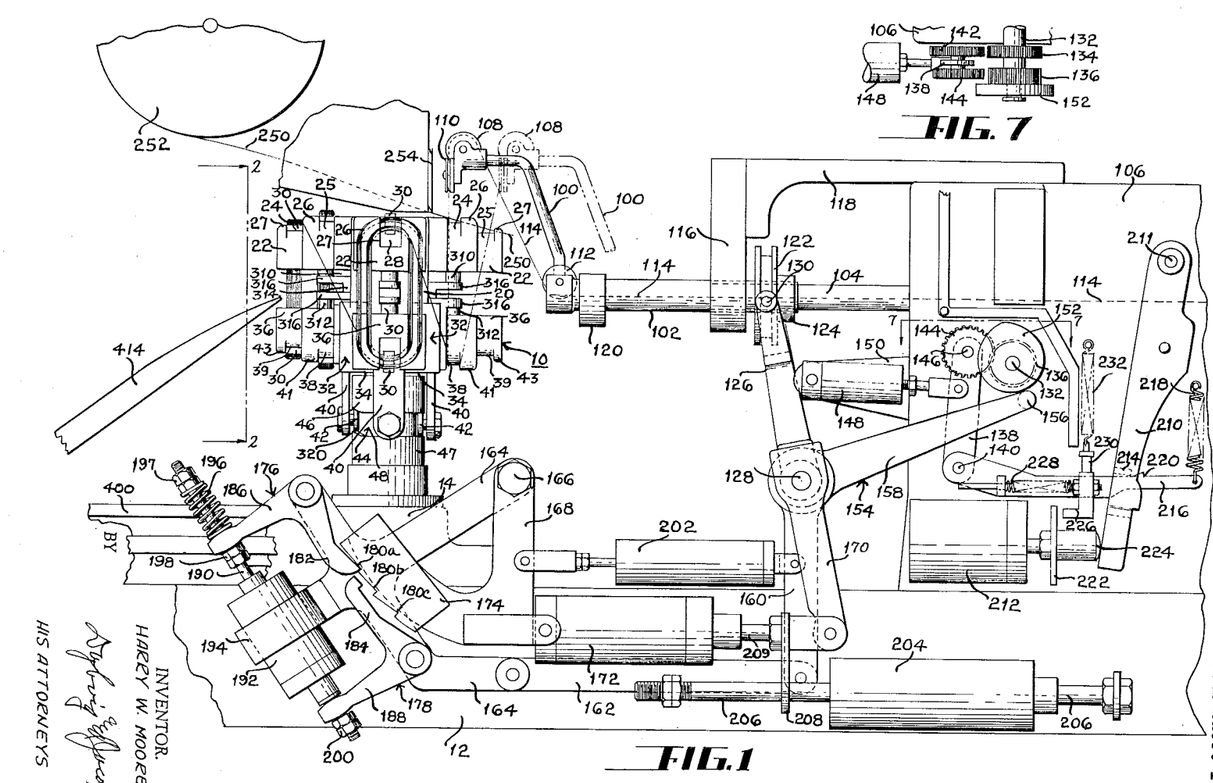
FIGURE 1 is a fragmentary side elevational view of the coil winding machine of this invention illustrating in fragmentary detail two positions of the flier for winding coils.
FIGURE 7 is a fragmentary plan view of a gear assembly, the view being taken substantially in the direction indicated by the line 7—7 of FIGURE 1.
Figures 4, 5, 6:
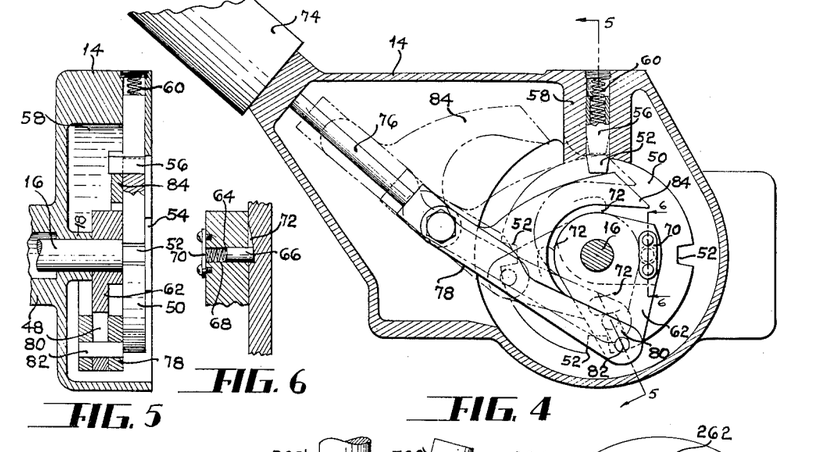
FIGURE 4 is an enlarged sectional view of the rotatable support for the turret receiver for the coils wound by the machine of FIGURE 1.
FIGURE 5 is a sectional view taken substantially along the line 5—5 of FIGURE 4.
FIGURE 6 is a sectional view taken substantially along the line 6—6 of FIGURE 4.

Referring to FIGURE 1 of the drawings, the turret assembly or turret receiver, identified by the reference numeral 10, is mounted upon a bed 12 which supports the major portion of the coil winding machine. A housing 14 mounted directly upon the bed 12 contains a mechanism for intermittently rotating the turret assembly. As best seen in FIGURES 4 and 5, a vertical shaft 16 journalled in a bearing 18 integral with the housing 14 serves as a rotatable support for the turret assembly.

Figures 3, 8:
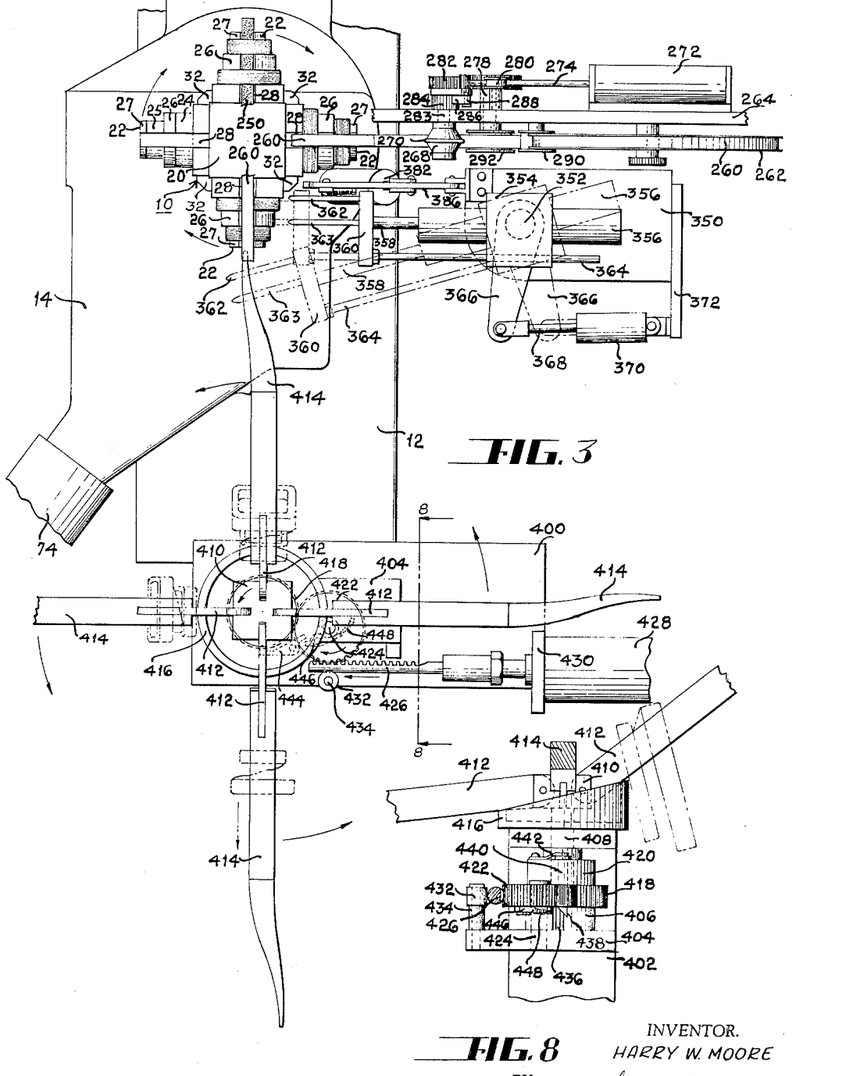
FIGURE 3 is a fragmentary plan view of the coil winding machine of FIGURE 1, the figure illustrating a coil accepting turret spindle employed for accumulating completed coils ejected from the coil winding machine, and further illustrating two positions of an ejector assembly for moving coils from the coil winding machine to the accumulating spindles.
FIGURE 8 is a sectional view taken substantially along the line 8—8 of FIGURE 3.

With reference to FIGURE 3, the turret assembly is mounted upon a substantially cubic block 20 splined to the shaft 16 so as to rotate therewith. Fixedly secured to the four vertical faces of this block 20 are four coil forming projections 22, each provided with successively stepped channels 24 and 25 bounded by vertical walls 26 and 27. These channels 24 and 25 receive coils as they are wound, as will be subsequently described.

The upper portions of these projections 22 are provided with slots 28 extending normal to the channels 24 and 25, these slots receiving mandrel elements 30, which will be described in detail subsequently.

Figure 2:
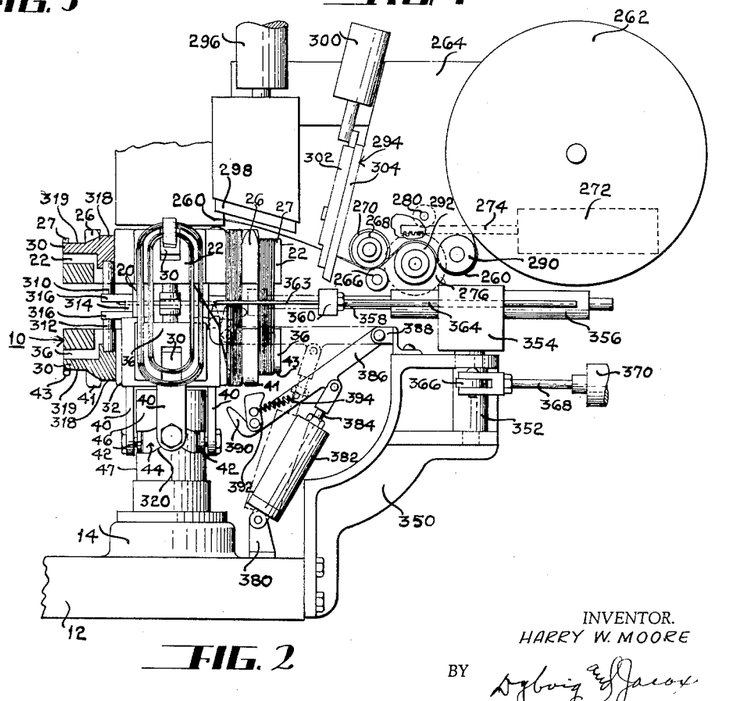
FIGURE 2 is a fragmentary end elevational view of the coil winding machine taken from the direction indicated by the line 2—2 of FIGURE 1, with portions shown in section and other portions broken away to reveal operational detail.

As best seen in FIGURES 1 and 2, runners 32 are fixedly secured to the lower portions of the vertical edges of the block 20. These runners 32 are provided with flange portions 34 disposed in parallel relation to the vertical faces of the block 20. These flange portions, there being two arranged in spaced parallel relation on each vertical face of the block 20, provide a recessed slot for receiving projections 36 extending from each vertical face of the block 20 in spaced relation to the projections 22. These projections 36 are adapted to slide vertically between the flange portions 34, so as to be slidable relative to the projections 22.

The projections 36 are similar to the projections 22, each being provided with stepped channels 38 and 39 aligned vertically with the channels 24 and 25, respectively. The channels 38 and 39 are bounded by walls 41 and 43 aligned vertically with the walls 26 and 27. The construction and arrangement is such that when the projections 22 and 36 are properly spaced on the block 20, these cooperate to provide a pair of coil receivers upon which coils may be wound, one coil being wound into the aligned channels 24 and 38 and the other coil being wound into the channels 25 and 39.

Proper spacing between the projections 22 and 36 is attained through the following mechanism. Fixedly secured to each projection 36 is a downwardly extending link 40 supporting a cam follower wheel 42. This wheel rides within an annular cam recess 44 formed by sleeves 46 and 47 fixedly secured in spaced relation to a tubular shaft 48 integral with the housing 14. The cam recess 44 thus determines the vertical position of the several projections 36.

The turret assembly is rotated by a mechanism within the housing 14, best seen in FIGURES 4, 5, and 6. Splined to the shaft 16 supporting the turret assembly is an indexing cam 50 provided at the periphery thereof with four equi-spaced notches 52. The cam 50 rests upon a bearing plate 54 abutting the bed 12. The cam 50 is indexed by a detent 56 slidably mounted in a housing 58 integral with the housing 14. A spring 60 urges the detent 56 into engagement with the indexing cam 50.

Rotatably mounted upon the shaft 16 adjacent the cam 50 is an actuating arm 62. A vertical bore 64 in the arm 62 houses a detent 66 biased downwardly by a spring 68 abutting a plate 70 covering the bore 64. The detent engages U-shaped inclined notches 72 provided in the adjacent surface of the indexing cam 50. These notches 72 are arranged at equal radial positions 90° apart with respect to the axis of the shaft 16, and are inclined circumferentially, such that the detent 66 will lock in the notches 72 when the actuator arm 62 is rotated clockwise relative to the cam 50, and will pass over the notches 72 without locking with the cam 50 when the actuator arm is rotated counterclockwise relative to the cam 50, as viewed in FIGURE 4.

An air cylinder 74 fixedly secured to the housing 14 actuates a connecting rod 76 pivotally engaging a link 78, the latter pivotally engaging the actuator arm 62, for rotating the actuator arm 62. A slot 80 inclined slightly from a radial direction in the actuator arm 62, this slot receiving a pin 82 carried by the link 78, provides for lost motion of the link 78 relative to the actuator arm 62.

The operation of the turret rotating mechanism is as follows. Initially, the turret is in a position determined by the indexing cam 50 engaged by the detent 56. The connecting rod 76 is initially in an extreme forward position relative to the air cylinder 74. Due to the angular position of the slot 80 in the actuator arm 62, the link 78 engages the actuator arm 62 at maximum radius. The dimensions of the link 78 and connecting rod 76 are such that the detent 66 carried by the actuator arm 62 is seated within one of the notches 72 in the upper surface of the cam 50. Accordingly, the indexing cam 50 and the actuator arm 62 are prevented from clockwise rotation as viewed in FIGURE 4 by the detents 56 and 66.

Upon actuation of the air cylinder 74 to retract the connecting rod 76, this rod tends to draw the actuator arm in the clockwise direction, but cannot due to the operation of the detents 56 and 66. Accordingly, the link 78 initially moves laterally, the pin 82 undergoing lost motion in the slot 80. This lateral motion moves an arcuate actuator cam 84 into engagement with the detent 56, disengaging this detent from the indexing cam 50. This frees the indexing cam 50 for clockwise movement, the indexing cam being rotated 90° by the actuator arm 62 through the action of the air cylinder 74. As the cam 50 commences rotation, the actuator cam 84 clears the housing 58 for the detent 56, releasing this detent. The detent 56 then rides the periphery of the indexing cam 50 until the next notch 52 of that cam comes into registry and is engaged by the detent. By this mechanism, the turret assembly is rotated 90°.

The mechanism resets as follows. At the termination of the turret rotation cycle, the air cylinder 74 is reversed, to expel the connecting rod 76. This reversal may be accomplished by reversing the air flow in the air cylinder 74, or by use of a spring return. The reversal causes the link 78 to drive the actuator arm 62 in the counterclockwise direction, the detent 66 being inoperative in this direction of movement as described hereinbefore. As the actuator arm 62 approaches its initial position, the slot 80 cooperates with the pin 82 to shift the link 78 laterally, swinging the actuator cam 84 laterally to clear the detent 56. When the actuator arm 62 reaches its initial position the detent 66 seats in a new notch 72 in the indexing cam 50, whereupon the turret rotating mechanism is reset.

As is apparent from the aforesaid, the turret rotating mechanism is capable of rotating the turret assembly intermittently through 90° of rotation upon intermittent actuation of the air cylinder 74. The turret rotating mechanism is employed to successively present the four pairs of coil forming projections carried by the turret assembly to a flier for receiving coils. The operation of the flier will next be described.

Flier Assembly

Referring to FIGURE 1, the flier 100 is fixedly secured to a sleeve 102 splined for sliding axial movement to a tubular drive shaft 104. The axis of the shaft 104 coincides approximately with the geometric center of the block 20 of the turret assembly. The shaft 104 is rotated by a suitable power supply and gear mechanism, not shown, housed in a housing 106 fixedly mounted on the bed 12.

One end of the flier 100 is provided with right angularly disposed pulleys 108 and 110 cooperating with a pulley 112 associated with the shaft 104 to feed a wire, indicated by the reference numeral 114, to the turret receiver. The wire 114 is supplied to the flier 100 from a dewind reel, not shown, through the drive shaft 104. Tensioning means, not shown, associated with the dewind reel, retain the wire 114 taut at all times.

The sleeve 104 supporting the flier 100 is journalled for rotation in a journal 116 secured in spaced relation to the housing 106 by a bracket 118. Ordinarily, the flier 100 is rotated at high speeds. Accordingly, as a means of eliminating wobble of the sleeve 102, the flier 100 is counterbalanced by a weight 120 mounted on the sleeve 102.

Rotation of the shaft 104 and therefore, the flier 100 is governed by a conventional clutch and brake mechanism, not shown, actuated by a lever 210, secured to a clutch actuating shaft 211, projecting through the housing 106, as shown in FIGURE 1. The lever 210 is actuated in a counterclockwise direction by an air cylinder 212 mounted on the housing 106. Internal spring means, not shown, bias the lever 210 in the clockwise direction as viewed in FIGURE 1. The lever 210 is provided with a lug 214 adapted to ride upon a latch 216 pivotally secured to the housing 106 on a pin 140. A spring 218 secured to the housing 106 biases the latch 216 into engagement with the lug 214. The latch 216 is provided with a notch 220 adapted to engage the lug 214 when the lever 210 is thrust in the counterclockwise direction by the air cylinder 212. With the lever 210 in this extreme counterclockwise position, the drive mechanism for the flier assembly is engaged so as to rotate the flier 100.

The lever 210 is released through operation of a suitable programming cam, not shown, which operates a slidably mounted plunger 230 to drive the latch 216 downwardly, as viewed in FIGURE 1, in opposition to a spring 232 anchored to the housing 106. The downward movement of the latch 216 releases the lever 210 so that it is able to move under spring tension in the clockwise direction to stop the movement of the flier 100.

A bracket 226 is slidably mounted on the latch 216 and biased to the left, as seen in FIGURE 1, by a spring 228 anchored to the latch 216. The bracket 226 is adapted to be actuated to the right by a disc 222 carried by the plunger 224 of the air cylinder 212. The bracket 226, when actuated to the right, is arrested by the plunger 230 associated with the programming cam, and is then in position to engage the lever 210 at an intermediate position wherein the flier 100 is free-wheeling. In the extreme clockwise position, the lever 210 actuates a brake for the flier 100.

In general, the operation of the lever 210 may be summarized as follows. To start the flier 100 the air cylinder 212 is energized moving the lever 210 to an extreme counterclockwise position engaging the notch 220 of the latch 216. Subsequently, the plunger 230 acting on the latch 216 releases the lever 210 which pivots in a clockwise direction to the intermediate position abutting the bracket 226 retained in position by the plunger 230. This is an idling position. Subsequently, the plunger 230 is permitted by the programming cam to rise under the influence of the spring 232 to release the bracket 226, thereby enabling the lever 210 to swing to an extreme clockwise position to brake the flier 100. The flier is braked at a predetermined position above the turret receiver and to one side of the turret receiver such that, upon subsequent rotation of the flier to wind a subsequent coil, the flier will first pass down, then under the turret receiver. This position is illustrated in FIGURE 1.

Fixedly secured to the sleeve 102 intermediate the journal 116 and the housing 106 is a pulley 122, this pulley being anchored against a collar 124. A yoke 126, pivotally mounted upon a fixedly mounted shaft 128, is provided with inwardly directly lugs 130 riding in the pulley 122. As will become more apparent from the following, the yoke 126 cooperating with the pulley 122 regulates the axial position of the flier 100 on the drive shaft 104.

Two interrelated mechanisms determine the axial position of the flier 100. One of these mechanisms reciprocates the flier 100 axially a distance corresponding to the width of the coil receiving channel pairs 24 and 38, and 25 and 39, associated with the turret assembly, so as to layer coils in these channels. The other mechanism shifts the flier from alignment with one channel pair to alignment with the other channel pair such that separate coils are successively wound. The positioning mechanisms are as follows.

With reference to FIGURES 1 and 7, a stub shaft 132 projects from the housing 106 at right angles to the drive shaft 104. This shaft 132 is rotated in synchronism with the shaft 104, but at a materially reduced speed, by a suitable gear reduction assembly not shown. Spaced gears 134 and 136 are journalled to the shaft 132 in spaced relation, the gear 134 being fixedly secured to the shaft 132 and the gear 136 being rotatably secured to the shaft 132.

A link 138, pivotally secured to the housing 106 by the pin 140, supports a pair of spaced gears 142 and 144, each splined to a shaft 146. These gears 142 and 144 are adapted to mesh with the gears 134 and 136 upon pivotal movement of the link 138. An air cylinder 148 secured to the housing 106 by a bracket 150 positions the gears 142 and 144 selectively into and out of engagement with the gears 134 and 136. The arrangement is such that the air cylinder 148 may be employed to connect the gear 136 selectively in driving engagement and free-wheeling engagement with the stub shaft 132.

A cam 152 is fixedly secured to the gear 136 so as to rotate therewith. This cam 152 is provided with a continuously varying radius ranging from a single minimum to a single maximum. The illustrated cam has diametrically opposed maximum and minimum values, however, the cam may take any desired shape within the aforesaid limitations.

A bell crank 154, pivotally mounted on the fixed shaft 128 and provided with a lug 156 on one arm 158 engaging the periphery of the cam 152, follows this cam. The opposite arm 160 of the bell crank pivotally engages a link 162. This link 162, in turn, pivotally engages a bracket 164 pivotally supported by a fixed shaft at 166. The bracket 164 moves in unison with the bell crank 154.

A second bracket 168 is also pivoted at 166. This bracket 168 is pivotally connected to an arm 170 pivotally engaging the yoke 126 through an air cylinder 172. Normally, the air cylinder 172 remains rigid and, therefore, the bracket 168 and yoke 126 will move in unison.

The brackets 164 and 168 are interconnected by a ratchet and pawl assembly as follows. An arcuate ratchet element 174 is fixedly secured to the bracket 168 and so positioned that it slides across the body portion of the bracket 164. The bracket 164 pivotally supports two bell crank pawl elements 176 and 178, these pawl elements being positioned to engage the several notches 180a, 180b, and 180c, of the ratchet element 174, with their respective pawl arms 182 and 184. The opposite arms 186 and 188 of the bell crank pawl elements loosely receive a shaft 190 of an air cylinder 192 fixedly secured to the bracket 164 by an annular ring clamp 194. A spring 196 coacting with locked nuts 197 provides a resilient connection between the bell crank pawl element 176 and the shaft 190. Locked pairs of nuts 198 and 200 space the arms 186 and 188 of the bell crank pawls a predetermined distance on the shaft 190. The air cylinder 192 is of the reversible type adapted to drive the shaft 190 in either direction upon selective actuation thereof.

It is to be noted that the pivotally mounted bracket 164 supports the air cylinder 192 in a position of gravitational unbalance. Accordingly, the bracket 164 is urged by weight of the air cylinder 192 in the counterclockwise direction as viewed in FIGURE 1. This force is transmitted to the bell crank 154, through the link 162, whereby the bell crank 154 is continuously urged into compressive engagement with the cam 152. The pawl arm 182 normally engages the ratchet element 174 through operation of the spring 196, however, a biasing force is required to urge the bracket 168 carrying the ratchet element 174 in the clockwise direction to maintain firm engagement between the ratchet element 174 and the pawl arm 182. This biasing force is supplied by a continuously energized air cylinder 202 pivotally secured at one end to the bracket 168 and at the other end to the bell crank 154, and striving to separate these members.

The operation of the mechanism for positioning the flier 100 axially on the shaft 104 is as follows. Initially the flier 100 is rotated in alignment with channels 24 and 38 of the turret assembly, as illustrated in solid line detail in FIGURE 1, to wind a coil. The cam 152 is rotated in synchronism therewith through the gears 134, 142, 144, and 136. As a consequence, the bell crank 154 and yoke 126 are oscillated in unison by the cam 152 through the ratchet and pawl assembly, the pawl arm 186 engaging the notch 180a of the ratchet element 174. Accordingly, the flier 100 reciprocates axially on the shaft 104.

The dimensions of the cam 152 are such that the flier 100 reciprocates the width of the channels 24 and 38. The relative rotary speeds of the flier 100 and the shaft 132 carrying the cam 152 are preset in accordance with the ratio of the width of the channels 24 and 38 to the diameter of the wire to be wound. The speed ratio of the flier 100 to the cam 152 is set to approximately twice the ratio of the channel width to the wire diameter. The flier will then wind a full layer of wire in the channels 24 and 38 for each 180° of rotation of the cam 152. As noted hereinbefore, the shape of the cam 152 may be varied to alter this layering process.

When the desired number of layers have been formed in the channels 24 and 38, rotation of the flier 100 and the cam 152 is interrupted by operation of the clutch mechanism described hereinbefore. The cam 152 then becomes free-wheeling on the shaft 132. Due to the force exerted against the periphery of the cam 152 by the bell crank 154, the cam 152 will be rotated until the bell crank 154 engages the point of minimum radius of the cam, thus resetting the cam preparatory to winding of the next coil.

To wind the next coil, it is necessary to shift the flier 100 from alignment with the channels 24 and 38 to alignment with the channels 25 and 39. This is accomplished as follows. With the flier 100 at rest, the air cylinder 192 is energized to move the pawl arm 182 out of engagement with the notch 180a in the ratchet element 174. This motion of the shaft 190 brings the pawl arm 184 into engagement with the notch 180b of the ratchet element 174, permitting the ratchet element 174 to pivot clockwise slightly, as viewed in FIGURE 1, under the influence of the continuously energized air cylinder 202. This slight clockwise movement is sufficient to align the notch 180b with the pawl arm 182. Subsequently, the air cylinder 192 is energized in the reverse direction, bringing the pawl arm 182 into engagement with notch 180b of the ratchet element and disengaging the pawl arm 184 from the ratchet element. This then permits an additional clockwise shift of the ratchet element 174 to seat the pawl arm 182 firmly in the notch 180b. The pawl arm 182 is now fully shifted from the notch 180a to the notch 180b.

The resultant shift of the flier 100 is from alignment with channels 24 and 38 of the turret receiver to alignment with channels 25 and 39 of the turret receiver. With the resetting of the cam 152, as described hereinbefore, the flier 100 is in position to wind a coil into the channels 25 and 39, however, an additional shift is first impressed upon the flier to insure that the wire fed by the flier is properly guided into the channel 25.

As illustrated in FIGURE 1, the wire supplied by the flier 100 is positioned vertically along one side of the turret receiver when the flier 100 is stopped after the winding of a coil on the channels 24 and 38. With the flier shifted to alignment with the channels 25 and 39, the air cylinder 172 is actuated to pull the arm 170 connected to the yoke 126 toward the bracket 168, thus shifting the flier 100 axially away from the turret receiver. After this overshift, the flier 100 is started through actuation of the lever 210 by the air cylinder 212. The flier then feeds the wire past the wall 26 between the channels 24 and 25 into the channel 25. As the flier starts, the air cylinder 172 is retracted to realign the flier 100 with the channels 24 and 25. Thereafter, through the action of the cam 152, the wire is layered within the channels 25 and 39.

It is to be noted that the success of this overshift action relies upon the specific construction of the turret receiver, wherein a gap is provided between the projections 22 and 36, and a wall is provided between the stepped channels 24 and 25 in each projection 22.

When a complete coil has been wound in the channels 25 and 39, the flier is stopped by operation of the programming cam regulating the clutch lever 210 at the predetermined position above the turret assembly. The turret receiver is next rotated a quarter turn, as described hereinbefore, to present new coil receiving projections 22 and 36 to the flier. Then the flier is reset axially by actuation of an air cylinder 204 mounted upon the side of the bed 12. This air cylinder is provided with a shaft 206 slidably engaging a plate 208 carried by the plunger shaft 209 of the air cylinder 172. Upon retraction of the shaft 206 by the air cylinder 204, the arm 170 connected to the yoke 126, the air cylinder 172, and the ratchet element 174 are all swung to the right, as viewed in FIGURE 1, a predetermined distance to reset the pawl arm 186 in the ratchet notch 180a. As a consequence, the yoke 126 swings the flier 100 to the left, as viewed in FIGURE 1, into alignment with the channels 24 and 38 of the turret receiver. The flier 100 is now in position to lay a new coil in the channels 24 and 38 presented to the flier.

It is to be noted that the ratchet element 174 contains an unused notch 180c, which could be used should the turret receiver be provided with a third set of coil receiving channels. In general, any reasonable number of coils can be wound in each position of the turret receiver if the turret receiver and ratchet element are constructed accordingly.

With the aforesaid mechanisms, a sequence of coils may be successively wound on the turret receiver. As these coils are wound, they are bound by adhesive tape with the following mechanism.

*Tape Laying Assembly*

Prior to the laying of coils in the channels 24 and 38 of the turret receiver, but after the turret receiver has been rotated a quarter turn to present new coil receiving channels to the flier 100, a strip of tape 250 is laid in the slot 28 of the projection 22 over the mandrel element 30 positioned therein. The tape 250, supplied by a reel 252, is fed by a conventional tape feeding mechanism under a cutting blade 254. The tape is fed adhesive side up into the slot 28. After the rotation of the flier 100 has wound the wire in the channels 24 and 38 thereby anchoring the tape 250 in place in the turret assembly, the blade 254 is actuated by an air cylinder, not shown, against the top of the turret assembly to cut the tape.

When coils have been laid into the spaced pairs of receiving channels 24 and 38 and 25 and 39, and the turret receiver has been rotated a quarter turn, a second strip of tape is laid over the completed coils by the mechanism illustrated in FIGURES 2 and 3. With reference to FIGURE 2, tape 260 is supplied by a reel 262 mounted on a panel 264 in spaced relation to the turret receiver. As best illustrated in FIGURE 2, the tapes 260 and 250 are fed to the turret receiver at right angles.

The tape 260 is pulled from the reel 262 by a pair of pinch rollers 266 and 268, the latter engaging the adhesive side of the tape with a bead 270. A roller 280 is driven with a gear train by an air cylinder 272 mounted on the panel 264 and provided with a plunger rack 274. The plunger rack 274 is held in engagement with a pinion 276 rotatably mounted on a shaft 278, by the roller 280. The pinion 276 engages a gear 282 rotatably journalled on a shaft 283 for driving the pinch roller 268. Secured to the shaft 283 adjacent the gear 282 is a ratchet wheel 284. This ratchet wheel engages a spring loaded pawl 286 supported by a shaft 288 carried by the gear 282. The arrangement is such that when the rack 274 is actuated to the left, as viewed in FIGURE 2, the pinch rollers are rotated to dewind tape. When the rack 272 is retracted, the pawl 286 disengages the ratchet wheel 284 to permit return of the rack 274 independent of the pinch roller 268.

The dewinding tape passes over free-wheeling serrated guide rollers 290 and 292 from the reel 262 to the pinch rollers, then from the pinch rollers through a knife assembly 294 to the slot 28 in the aligned projection 22 of the turret receiver. The tape 260 then overlies the previously laid tape 250 with the completed coils therebetween, as illustrated in FIGURE 3.

With the tape in position, an air cylinder 296 is actuated to drive a resilient sponge pad 298 against the tape 260, which lies adhesive side down, to compress the tapes 250 and 260 about the completed coils. The underlying mandrel element 30 serves as an anvil in this operation. With the end of the tape 260 secured, an air cylinder 300 is actuated to cut the tape. In the operation of the cylinder 300, a shearing element 302 is slid over a shear edge provided by an apertured guide 304 through which the tape 260 passes. The guide 304 is fixedly mounted on the panel 264.

The tape employed is preferably a paper backed adhesive tape, wherein the adhesive adheres firmly to itself, but not firmly to the wire forming the bound coil. For this purpose, a tape bearing a nearly dried rubber cement is employed. Such tape can be readily removed from the coil for subsequent handling of the coils.

The turret receiver is rotated a quarter turn when new coils have been wound by the flier 100 on the projections 22 and 36 of the adjacent newly taped coils. This subsequent rotation brings these newly taped coils diametrically opposite the flier 100 where these coils are released by the turret assembly. The release mechanism is described in the following.

Release Mechanism

To the left of FIGURE 2 in the drawings, an aligned pair of projections 22 and 36 has been shown in section to reveal the interior construction of the turret assembly. As noted hereinbefore, mandrel elements 30 are mounted within slots 28 provided in the projections 22 and 36. These mandrel elements 30 are supported by blocks 310 and 312 slidably mounted within the projections 22 and 36 abutting the face of the block 20. The upper block 310 is provided with a downwardly extending projection 314 abutting the lower block 312. The blocks 310 and 312 are provided with ledges 316 adapted to engage the interior surfaces of the projections 22 and 36 in a manner to be described in detail in the following.

Each mandrel element 30, as illustrated in FIGURE 2, is provided with stepped flats 318 and 319 separated by a sloped portion, the flats being aligned substantially with the channels 24, 25, 38 and 39 in the projections 22 and 36. The distance between aligned flats in the mandrel elements 30 is slightly less than the distance between aligned channels in the projections 22 and 36. The operation of the release mechanism is as follows. As noted hereinbefore, the vertical positions of the lower projections 36 of the turret receiver are determined by cam following links 40 engaging the cam recess 44 provided by sleeves 46 and 47. As illustrated in FIGURES 1 and 2, the cam recess 44 undergoes a marked rise at one position of the turret assembly. This rise is indicated by the reference numeral 320. Under the influence of the rise, the lower projections 36 of the turret assembly are elevated a fixed distance on arriving at a position diametrically opposite the flier 100. As the lower projection 36 rises half the fixed distance determined by the rise 320, it engages the ledge 316 associated with the lower mandrel support block 312. The lower support block is then driven upwardly by the lower projection 36 half the fixed distance determined by the rise 320. The mandrel support block 312 carries with it the lower mandrel element 30 and also elevates the upper support block 310 and therefore the upper mandrel element 30.

The result of the elevation of the lower projection 36 a unit distance is an elevation of the spaced mandrel elements 30 through half of the unit distance. This motion of the mandrel elements 30 carries the flats of these mandrel elements out of their respective channels 24, 25, 38 and 39 to positions flush with the walls 26 and 27 and 41 and 43 of the projections 22 and 36, respectively. As a consequence, the wound coils carried by the projections 22 and 36 are supported only by the spaced mandrel elements 30 in the position diametrically opposite the flier 100. In this position then, there is no obstruction preventing removal of the coils from the turret assembly by a radial sliding motion.

Removal of the released coils is accomplished by means of a mechanism described in the following.

The Ejector Assembly

An ejector assembly for removing released coils from the turret assembly is illustrated in FIGURES 2 and 3. The principal elements of the ejector assembly are mounted upon a bracket 350 fixedly attached to the bed 12 supporting the turret assembly, as illustrated in FIGURE 2. A shaft 352 mounted for rotation in the bracket 350 supports a block 354 provided with a boring into which an air cylinder 356 is fixedly positioned. The plunger element 358 of the air cylinder 356 supports a plate 360 which, in turn, supports a pair of spaced prongs 362 and 363. The plate 360 is secured in a fixed orientation by means of a shaft 364 journalled for sliding movement in the block 354 and fixedly secured to the plate 360.

As illustrated in FIGURE 3, the prongs 362 and 363 are aligned with the turret assembly, such that when the air cylinder 356 is actuated to drive the prongs toward the turret assembly, these prongs will move into the gap provided between the spaced projections 22 and 36. As the prongs move into this gap, one prong moves behind each of the two coils supported by the mandrel elements 30.

After the prongs 362 and 363 have been actuated to the position behind the coils supported by the mandrel elements 30 they are pivoted to urge the coils supported by the turret assembly radially away from the turret assembly by the following mechanism. Fixedly secured to the shaft 352 is an arm 366. This arm 366 is pivotally engaged by a plunger shaft 368 associated with an air cylinder 370 fixedly secured to the bracket 350 by means of a plate 372. This air cylinder 370 is a reversible air cylinder. Upon actuation of the air cylinder to retract the plunger shaft 368, the shaft 352 and block 354 carried thereby, are pivoted in the counterclockwise direction to the broken line position illustrated in FIGURE 3. This pivotal motion carries the coils engaged by the prongs 362 and 363 off the turret assembly and onto a spindle mechanism which will be described subsequently. When the prongs 362 and 363 have been pivoted to the aforesaid broken line position by the air cylinder 370, these prongs are retracted by operation of the air cylinder 356, then subsequently pivoted to the home position by operation of the air cylinder 370 in the reverse direction.

Due to the inherent operation of the flier 100 in winding coils upon the receiver, the several coils wound by the flier are all interconnected. This results from the fact that the coils are wound continuously from a single supply reel. The operation of the ejector mechanism as described thus far, will be such that the coils ejected from the turret receiver will be connected by a strand of wire to the coils remaining on the turret receiver. This prevents complete removal of coils from the turret receiver. It is desirable, however, to periodically sever the connection between the coils on adjacent pairs of projections 22 and 36 of the turret receiver. This is accomplished by the following mechanism which is illustrated in FIGURE 2.

A bracket 380 fixedly attached to the bed 12 adjacent the turret receiver pivotally supports an air cylinder 382 having a plunger 384. This plunger 384 supports an arm 386 pivotally secured to the bracket 350 by a bracket 388. The arrangement is such that actuation of the air cylinder 382 will pivot the arm 386 upwardly. The free end of the arm 386 terminates in a shearing projection 390 adapted to cooperate with a shear plate 392 pivotally mounted to the arm 386 in spaced relation to the projection 390. The shear plate 392 is urged away from the projection 390 by a spring 394 anchored to the arm 386, thus forming a V-shaped slot.

Upon actuation of the air cylinder 382, the arm 386 is pivoted upwardly to the dotted line position illustrated in FIGURE 2. The location and dimensions of the arm 386 are such that upon upward movement of the arm, the wire strand connecting the last formed coil in the position diametrically opposite the flier 100 with the first subsequently formed coil in the position 90° removed therefrom, falls into the V-shaped slot between the shearing projection 390 and the shearing plate 392 carried by the arm 386. The location and dimensions of the arm 386 will depend upon the exact shape of the turret receiver, that is, the number of coils the turret receiver is designed to receive, the position of the walls associated with the coil receiving channels, and so on, these factors determining the location of the wire strand interconnecting sets of coils. The arm 386 is located empirically to engage this strand. This wire strand when engaged by the arm 386 is not cut, but is in position to be cut.

Actuation of the air cylinder 382 precedes actuation of the air cylinder 356 associated with the ejection assembly when it is desired to cut the wire strand engaged by the cutting mechanism. When the air cylinder 356 is subsequently actuated to advance the prongs 362 and 363 into the turret assembly, the plate 360 supporting these prongs is driven against the shear plate 392 carried by the arm 386. This action is shown in broken line detail in FIGURE 2. As a result, the shear plate 392 is driven into coaction with the shearing projection 390 to sever the wire strand engaged thereby. This frees the completed and released coils for removal by the ejector assembly.

As will become more apparent in the following, the coils are collected by a spindle mechanism adapted to accumulate a plurality of coils on each of a plurality of arms. Accordingly, it is found desirable to energize the air cylinder 382 to sever the connection between successively formed pairs of coils only periodically in accordance with the capacity of the accumulating device which will now be described.

The Accumulator Assembly

The accumulator assembly is best illustrated in FIGURES 3 and 8 of the drawings. This assembly is mounted upon a platform 400 fixedly mounted adjacent the bed 12 carrying the turret assembly. As best illustrated in FIGURE 8, a support 402 mounted upon the platform 400 supports a second horizontal platform 404. Resting on the platform 404 is an indexing cam 406 into which is journalled a vertical shaft 408 supporting a cubical member 410. The cubical member is provided with slots in the vertical faces thereof, receiving substantially horizontally extending links 412, these links engaging and supporting spindles 414. The spindles 414, which are fixedly secured to the cubical member 410, rest upon a truncated cup 416. This cup 416 serves as a cam for determining the inclination of the spindles 414 from the horizontal. The arrangement is such that four spindles spaced 90° apart are mounted for rotation with the shaft 408.

The shaft 408 is rotated intermittently through 90° so as to rotate the spindles through 90° by the following mechanism. Rotatably mounted upon the shaft 408 in abutment with the indexing cam 406 is a gear 418. Adjacent the gear 418 is a cylindrical member 420 rotatably mounted upon the shaft 408. The gear 418 is engaged by a second gear 422 mounted upon a separate shaft 424 fixedly secured to the platform 400. The second gear 422 is engaged and rotated by a rack element 426 actuated by an air cylinder 428 fixedly secured to the platform 400 by means of a bracket 430. The rack element 426 is supported in engagement with the gear 422 by a roller 432 journalled upon a shaft 434 fixedly secured to the platform 404. With reference to FIGURE 3, the arrangement is such that upon the rack element being driven to the left by the air cylinder 428, the spindles are rotated in the counterclockwise direction.

The rotation of the spindles is regulated by the indexing cam 406. The indexing cam is provided with four equispaced vertically extending notches 436 in the periphery thereof. Adjacent each of the notches 436 at the top of the indexing cam 406 is a V-shaped slot 438 adapted to receive a truncated detent element 440 penetrating the cylindrical member 420 and the gear 418, and pressed downwardly against the indexing cam 406 by a spring 442. As will become more apparent from the following, the slot 438 in the indexing cam 406 and the detent 440 in the cylindrical member 420, cooperate to provide an escapement for the indexing cam.

A pivotally mounted dog 444 is pivotally mounted on the platform 404, as best illustrated in FIGURE 3. Spring means, not shown, bias this dog into engagement with the periphery of the indexing cam 406. An actuator 446 for the dog 444 is pivotally secured to the gear 422 and biased to a fixed orientation by a spring 448 anchored to the gear 422. In this fixed orientation one end of the actuator 446 abuts the shaft 424 supporting the gear 422.

The operation of the indexing mechanism is as follows. The detent 440 coacts with the indexing cam 406 to permit rotation of the gear 418 independently of the indexing cam when this gear moves in the clockwise direction as viewed in FIGURE 3. When the gear 418 is rotated in the counterclockwise direction, as viewed in FIGURE 3, the detent 440, which penetrates the gear 418, drops into one of the slots 438 in the cam element 406 causing the driven gear 418 to drive the cam 406 so as to rotate the shaft 408, thereby rotating the spindles 414. The arrangement is such that when the rack element 426 is driven to the left, as viewed in FIGURE 3, the detent 440 will travel through approximately 10° of lost motion in the counterclockwise direction before engaging a slot 438 in the indexing cam 406. This 10° of lost motion enables the gear 422 to carry the actuator 446 in the clockwise direction, as viewed in FIGURE 3, into engagement with the dog 444 to pivot this dog away from the indexing cam, freeing the indexing cam for rotation. Then, as the detent 440 engages the indexing cam, the cam is free to rotate. The thrust of the air cylinder 428 is sufficient to rotate the indexing cam and therefore the spindles 90°. As the rotation of the spindles approaches 90°, the actuator 446 will have cleared the dog 444 and this dog will drop into one of the notches 436 of the indexing cam to arrest the rotation of this indexing cam at exactly 90°.

The air cylinder 428 later retracts the rack element 426 and the gear 422 is thereby rotated in the counterclockwise direction. The detent 440 moves freely upon the cam 406 so that the indexing cam is not rotated. The actuator 446 carried by the gear 422, clears the dog 444 due to the yielding of the spring 448. The total retraction of the rack element 426 is sufficient to rotate the gears 418 and 422 approximately 100°, to carry the detent 440 past the next adjacent slot 438 in the indexing cam. As a result, retraction of the rack element 426 fully resets the indexing mechanism for the next 90° rotation of the spindles 414.

As the spindles 414 rotate, these spindles move from a position inclined above the horizontal to the horizontal in the first quarter turn, and from the horizontal to a position declined from the horizontal in the second quarter turn. When a particular spindle 414 is in the position in which it is inclined from the horizontal, the end of the spindle is positioned in close proximity to the portion of the turret receiver from which coils are ejected, as illustrated in FIGURE 1. Upon ejection of coils they will travel downwardly on the spindles. When this spindle has been rotated through two quarter turns, that is, a full 180° turn, the spindle will then be declined from the horizontal and the coils carried thereby will slide off the spindle. Any convenient receiving bin may be provided for receiving the discharged coils.

As indicated hereinbefore, it has been found preferable to accumulate a plurality of pairs of coils on each spindle 414. Accordingly, while one pair of coils will be ejected from the turret receiver each time the turret receiver is rotated 90°, the pairs of coils will be separated by severing the connecting strands therebetween only once every several cycles and the spindles 414 will be rotated accordingly. It is possible, however, to sever each pair of coils as they are ejected from the receiver and rotate the spindles once each time a pair of coils is ejected from the receiver. In the following, the complete programming of the coil winding machine will be reviewed.

*Programming*

The over all operation of the coil winding machine is as follows. To initiate operation of the coil winding machine, wire is initially fed through the flier 100 and anchored at any suitable place to the turret receiver. Preferably, the wire is anchored to the coil forming projections 22 and 36 which would have received coils in a previous operating cycle had the coil winding machine been in continuous operation. Before the flier is set into operation the tape assembly is actuated to lay a strip of tape 250 across the channels 24 and 25 about to receive coils.

With the wire anchored and the tape 250 in place, the flier 100 is set into rotation by actuation of the air cylinder 212 operating the control lever 210. Rotation of the cam 152 in synchronism with the flier 100 produces a layering of wire in the aligned coil receiving channels 24 and 38. After a predetermined number of rotations of the flier 100, the control lever 210 is released to stop the rotation of the flier at the predetermined location illustrated in FIGURE 1.

The air cylinder 192 is next energized to move the flier 100 to a new position in alignment with the coil receiving channels 25 and 39. Simultaneously, the air cylinder 148 is actuated to permit resetting of the cam 152. Next, the air cylinder 172 is actuated to produce an overshift of the flier 100. While the air cylinder 172 is in the actuated position, the air cylinder 212 is energized to actuate the control lever 210 to renew rotation of the flier 100. As rotation of the flier 100 commences, the air cylinder 172 is returned to its home position. The flier 100 then reciprocated by the cam 152 lays a second coil in the receiving channels 25 and 39.

When the second coil has been completed by a predetermined number of turns by the flier 100, the control lever 210 is released to stop the rotation of a flier. Two coils having now been wound upon the receiver, the air cylinder 74 is energized to rotate the turret receiver 90°. Simultaneously, the air cylinders 148 and 204 are actuated. The air cylinder 148 permits resetting of the cam 152. The air cylinder 204 resets the flier to a position in alignment with coil receiving channels 24 and 38 newly presented to the flier 100. The flier 100 and turret receiver are now positioned to wind two additional coils in a manner described hereinbefore. Before the flier 100 is set into rotation by actuation of the air cylinder 212, however, the mechanism for feeding the tape 250 to the turret receiver is actuated to lay a tape face up in the channels 24 and 25 of the turret receiver.

As two new coils are being wound upon the turret receiver, the air cylinder 272 is actuated to position the tape 260 over the previously formed pair of coils positioned 90° away from the flier 100. Subsequently, the air cylinder 296 and 272 are actuated to cut the tape 260 and to press this tape against the tape 250 to bind the coils.

When the second pair of coils have been formed on the turret receiver, the turret receiver is again rotataed and the flier mechanism is reset. The first formed pair of coils is now in the position diametrically opposite the flier 100, which is the release position of the turret assembly.

In this position, the first formed pair of coils is supported upon the mandrel elements 30. While the third pair of coils is being wound by the flier 100, the ejector mechanism is brought into operation by actuation of the air cylinder 356 to drive the prongs 362 and 363 into the turret assembly. Subsequent actuation of the air cylinder 370 ejects the first formed pair of coils onto the adjacent spindle 414.

After a predetermined number of pairs of coils have been formed and ejected onto the spindle 414 and before the last pair of coils of a series is to be ejected, the air cylinder 382 is actuated to bring the wire shearing assembly into position for actuation by the air cylinder 356. When this severed pair of coils has been ejected onto the spindle 414, the air cylinder 428 is brought into operation to rotate the spindle 90°.

It is, of course, to be understood that the programming just described is but one of many programs that may be employed in the operation of the coil winding machine. Thus, for example, many variations may be made in the sequential operation of the tape laying and cutting mechanism, the ejection mechanism, and the spindle rotating mechanism.

It is also to be understood that while air cylinders have been described as supplying power for many of the mechanisms of this invention, equivalent power sources may be obtained through the use of electrically energized solenoids or hydraulically energized pistons.

Although the preferred embodiment of this device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention I claim:

1. In a coil winding machine, a flier for winding a wire to form coils, a driven shaft for rotating said flier, said flier being slidably mounted upon said shaft so as to be adjusted axially therealong, a coil receiver including a pair of complementary coil forming projections supported one above the other in spaced relation with a gap therebetween, one projection being provided with a pair of adjacent transverse channels, said channels cooperating with the other projection to provide coil forms for receiving successively wound coils, said one projection having a wall separating the channels therein, means supporting said projections in axially spaced relation to said driven shaft, means for shifting said flier axially on said driven shaft for aligning said flier successively with each of said channels, and means for temporarily overshifting said flier away from said projections after a coil is wound into one channel to draw the wire partially into the gap between said projections, the arrangement being such that said wire catches upon said wall and is guided thereby into the other channel upon subsequent rotation of said flier.

2. The coil winding machine according to claim 1 wherein the transverse channels in said one projection are stepped one below the other to provide coil forms for receiving successively smaller coils.

3. In a coil winding machine, a flier for winding a wire to form coils, a driven shaft for rotating said flier, said flier being slidably mounted on said shaft so as to be adjusted axially therealong, a coil receiver, said coil receiver including a pair of complementary coil forming projections supported one above the other in spaced relation with a gap therebetween, one projection being provided with a pair of adjacent transverse channels, said channels cooperating with the other projection to provide coil forms for receiving successively wound coils, said one projection having a wall separating the channels therein, means supporting said projections in axially spaced relation to said driven shaft, and means for shifting said flier axially on said driven shaft, said last named means comprising a cam wheel, means driving said cam wheel in synchronism with said driven shaft, a pivotally mounted cam follower responsive to said cam wheel, a pivotally mounted yoke for actuating said flier axially along said driven shaft, linkage means interconnecting said cam follower with said yoke whereby said flier is caused to move in unison with said cam follower so as to layer wire into a channel, means for adjusting said linkage means to shift the angular position of said yoke relative to said cam follower to thereby shift the position of said flier relative to said coil receiver to wind coils in successive channels thereof, and means for temporarily overshifting said flier away from said coil receiver after a coil is wound into one channel to draw the wire partially into the gap between said projections, the arrangement being such that said wire catches upon said wall portion and is guided thereby into the other channel upon subsequent rotation of said flier.

4. The structure according to claim 3 wherein said linkage means includes ratchet and pawl elements pivotally mounted in fixed spaced relation to the pivotal axis of said cam follower, means supporting one of said elements in spaced relation to said cam follower whereby said elements move in unison with said cam follower, means supporting the other of said elements in spaced relation to said yoke, said ratchet and pawl elements being interengaged whereby said yoke is moved in unison with said cam follower through said interengaging ratchet and pawl elements, and means for shifting the position of said pawl element relative to said ratchet element to thereby shift the angular position of said yoke relative to said cam follower.

5. The structure according to claim 3 including means urging said cam follower radially into engagement with said cam wheel, said cam wheel having a radius varying continuously from a single minimum value to a single maximum value, and means for releasing said cam wheel momentarily from said driving means whereupon said cam follower drives said cam wheel to a predetermined position with the cam follower engaging the cam wheel at the point of minimum radius.

6. The structure according to claim 3 wherein said linkage means includes a pivotally mounted pawl element, means securing said pawl element in spaced relation to said cam follower whereby said pawl element moves in unison with said cam follower, a pivotally mounted ratchet element engaging said pawl element, and expansible means connecting said ratchet element in spaced relation to said yoke, whereby said yoke moves in unison with said cam follower, the means for adjusting said linkage means including means for shifting the position of said ratchet relative to said pawl, and means for temporarly expanding said expansible means.

7. In a coil winding machine, a flier for winding a coil, a shaft for rotating said flier, said flier being slidably mounted upon said shaft, and means for reciprocating said flier axially along said shaft to cause the coil to be wound in layers, said means including a cam wheel having a radius varying continuously from a single minimum value to a single maximum value, drive means rotating said cam wheel in synchronism with said flier, cam following means forcefully engaging the periphery of said cam wheel reciprocating said flier in accordance with said cam wheel, and means for disengaging said cam wheel from said drive means whereupon said cam following means rotates said cam wheel to a predetermined position with the cam following means engaging the cam wheel at the point of minimum radius, the flier being thereby actuated to a predetermined position by said cam following means.

8. In a coil winding machine, structure for receiving a coil as it is wound, said structure including a supporting body and two parallel projections extending therefrom, the first of said projections being secured fixedly to said body, the second projection being mounted on said body for sliding movement to and fro with respect to said first projection, said projections having aligned transverse channels cooperating to receive a coil wound about both projections, operating means for moving said second projection toward said first projection to release the wound coil, and means mounted on said body actuated by movement of said second projection for lifting the released coils out of said channels, said last mentioned means including support structure for holding the released coils out of said channels.

9. In a coil winding machine, the structure according to claim 8 wherein said projections each have a longitudinal slot intersecting with the transverse coil receiving channel therein, and wherein the support structure for holding the released coils out of said receiving channels includes a pair of mandrel elements supported slidably by said body, there being one mandrel element positioned in each said projection in the slot therein, the mandrel elements being slidable in their respective slots between extreme positions, one wherein the mandrel element projects into the adjacent coil receiving channel and the other wherein the mandrel element is removed from the adjacent coil receiving channel, said mandrel elements coacting one with the other upon movement of said second projection toward said first projection to position one another in said one extreme position.

10. In a coil winding machine, the structure according to claim 8, wherein said supporting body is a rotatably mounted turret and wherein said operating means includes means for rotating said turret, means providing an annular cam surface encircling said turret, and cam follower means carried by said second projection, said cam follower means coacting with said cam surface upon rotation of said turret to position said second projection relative to said first projection.

References Cited in the file of this patent

UNITED STATES PATENTS

| 2,394,028 | Volsk | Feb. 5, 1946 |
| 2,445,109 | Ferguson | July 13, 1948 |
| 2,514,251 | Moore et al. | July 4, 1950 |
| 2,614,588 | Laycock | Oct. 21, 1952 |
| 2,624,374 | Burge et al. | Jan. 6, 1953 |
| 2,705,978 | Caldwell | Apr. 12, 1955 |
| 2,724,415 | Orth | Nov. 22, 1955 |
| 2,736,345 | Caldwell | Feb. 28, 1956 |
| 2,782,809 | Smallridge | Feb. 26, 1957 |
| 2,861,601 | Marzolf | Nov. 25, 1958 |